(12) United States Patent
Choi

(10) Patent No.: US 8,462,128 B2
(45) Date of Patent: Jun. 11, 2013

(54) SONG WRITING METHOD AND APPARATUS USING TOUCH SCREEN IN MOBILE TERMINAL

(75) Inventor: Guang Yong Choi, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 736 days.

(21) Appl. No.: 12/547,556

(22) Filed: Aug. 26, 2009

(65) Prior Publication Data

US 2010/0053105 A1  Mar. 4, 2010

(30) Foreign Application Priority Data

Sep. 1, 2008  (KR) .................. 10-2008-0085826

(51) Int. Cl.
*G06F 17/00* (2006.01)
(52) U.S. Cl.
USPC ........................ 345/173; 715/810; 715/773
(58) Field of Classification Search
None
See application file for complete search history.

(56) References Cited

U.S. PATENT DOCUMENTS

2008/0184872 A1* 8/2008 Hunt et al. .................. 84/645
2010/0287471 A1* 11/2010 Nam et al. ................... 715/702

FOREIGN PATENT DOCUMENTS

JP   2005-072809   3/2005
KR   2004-086941   10/2004

OTHER PUBLICATIONS http://moocowmusic.com/PianistPro/index.html Jul. 2008.*
http://www.youtube.com/watch?v=KXqbf1F1x9U;bcsi-ac-2160f1cfec5c399f=1EA3115600000102UEVE1zVZSMKuTrqnJR J1/HCbmT+LEgAAAgEAAFiiRQCEAwAAAQAAAJCbFAA= Jul. 2, 2008.*
http://moocowmusic.com/Band/ 2008.*
Steve JObs keynote live from WWDC Jun. 9, 2008.*
moocowmusic: "Pianist"; Aug. 5, 2008; <http://web.archive.org/web/20080805043923/ http://moocowmusic.com/Pianist/index.html>; (retrieved Mar. 8, 2010); XP002572494.
moocowmusic: "Band"; Aug. 5, 2008; <http://web.archive.org/web/20080805040231/ http://moocowmusic.com/Band/index.html>; (retrieved Mar. 8, 2010); XP002572495.

* cited by examiner

*Primary Examiner* — Van Chow
(74) *Attorney, Agent, or Firm* — Cha & Reiter, LLC

(57) ABSTRACT

A song writing method and apparatus using a touch screen in a mobile terminal are disclosed. The song writing method includes: displaying, upon activation of a song writing mode, an onscreen musical keyboard of an octave on the touch screen; identifying, when a key of the onscreen musical keyboard is touched, a musical note mapped to the touched key through computation of coordinates of the touched key; creating musical interval data on the basis of the identified note and the current octave level; and converting the musical interval data into sound data recognizable by the mobile terminal and outputting the sound data. Hence, various types of songs can be conveniently composed through the song writing method employing the onscreen musical keyboard. The applicability of the mobile terminal can be extended through a function that can mix a written song with contents generated through various musical instruments.

17 Claims, 9 Drawing Sheets

SONG WRITING METHOD AND APPARATUS USING TOUCH SCREEN IN MOBILE TERMINAL

CLAIMS OF PRIORITY

This application claims the benefit, pursuant to 35 USC 119, to that patent application entitled "SONG WRITING METHOD AND APPARATUS USING TOUCH SCREEN IN MOBILE TERMINAL" filed in the Korean Intellectual Property Office on Sep. 1, 2008 and assigned Serial No. 10-2008-0085826, the contents of which are incorporated herein by reference.

BACKGROUND OF THE INVENTION

1. Field of the Invention

The present invention relates generally to a mobile terminal and, more particularly, to a song writing method and apparatus using the touch screen in a mobile terminal.

2. Description of the Related Art

With recent advances in communication technologies, mobile terminals have been widely popularized and have become one of the necessities of life. Such a mobile terminal enables conversation between a caller and recipient through a mobile communication network, and produces a bell sound, alarm sound and background music to notify reception of a call or text message by playing back a preset song file using an embedded hardware chip.

In particular, a mobile terminal capable of playing back music files can produce high quality sounds and store a large number of song files thanks to advanced memory chips.

With proliferation of user generated contents (UGC) containing self-produced songs and moving images, users show a growing interest in creating songs or video materials utilizing mobile terminals.

The user of a mobile terminal may directly write a song by inputting through the keypad or by entering musical notes or drawing waveforms on the touch screen, and store the written song in a music file format for hearing or saving.

However, song writing through keypad input requires the user to be skillful in manipulation of various keys, and song writing through musical notes or waveforms requires the user to have some background knowledge of music. This process is long and cumbersome and, thus, a user is inconvenienced in developing songs.

In addition, there may be restrictions on representing information regarding the music paper for drawing musical notations or the palette for drawing waveforms, on the single touch screen.

SUMMARY OF THE INVENTION

The present invention provides a method that can increase utilization of song writing programs in a mobile terminal by implementing a user-friendly musical keyboard on an intuitive user interface.

The present invention also provides a method that can overcome the space limitation by displaying only a musical keyboard of an octave and simple setting keys.

The present invention further provides a method that can mix a song written through an onscreen musical keyboard with contents generated through various musical instruments.

In one embodiment of the present invention, a song writing method using a touch screen in a mobile terminal includes: displaying, upon activation of a song writing mode, an onscreen musical keyboard of an octave on the touch screen; identifying, when a key of the onscreen musical keyboard is touched, a musical note mapped to the touched key through computation of coordinates of the touched key; creating musical interval data on the basis of the identified note and the current octave level; and converting the musical interval data into sound data recognizable by the mobile terminal and outputting the sound data.

In another embodiment of the present invention, a song writing apparatus using a touch screen in a mobile terminal includes: a display unit displaying, upon activation of a song writing mode, an onscreen musical keyboard of an octave on the touch screen; a data processing section identifying, when a key of the onscreen musical keyboard is touched, a musical note mapped to the touched key through computation of coordinates of the touched key, creating musical interval data on the basis of the identified note and the current octave level, and converting the musical interval data into sound data recognizable by the mobile terminal and outputting the sound data; and a control unit outputting the sound data.

In the embodiments of the present invention, various types of songs can be conveniently composed through an enhanced song writing program employing an onscreen musical keyboard on the touch screen of a mobile terminal.

The applicability of a mobile terminal can be extended through a function that can mix a song written through an onscreen musical keyboard with contents generated through various musical instruments.

The song writing method can transform the user of a mobile terminal from a passive consumer only listening to songs created by others to an active creator self-producing songs that can be shared with others.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

To help understand the invention, the following definitions are used: an 'octave' is a series of eight notes in a musical scale. That is, an octave is the interval between a reference note and the eighth note therefrom in a musical scale. For example, an octave includes eight notes between the middle 'Do' and the next 'Do' in the same pitch class. In a typical musical keyboard, the middle 'Do' corresponds to the note at the center, and the next 'Do' corresponds to a lower 'Do' or higher 'Do', which is the eighth note from the middle 'Do'. Musical 'interval data' indicates data obtained on the basis of notes corresponding to keys touched on the musical keyboard and the current octave. 'Sound data' is data that can be recognized by a mobile terminal and is obtained through conversion from at least one piece of interval data. For example, sound data may include files, usable in a mobile terminal, in an MP3 (Moving Picture Experts Group Audio Layer-3) format, a WMA (Windows Media Audio) format, a RA (Real Audio) format, an AIFF (Audio Interchange File Format) format, and a MIDI (Musical Instrument Digital Interface) format. Sound data in a first file format may be converted into sound data in a second file format depending upon the particular application(s) being used. 'Mixing' indicates a procedure that mixes a song written through an onscreen musical keyboard and contents generated through other musical instruments together into a new song. Mixing may indicate a procedure that generates interval data by replacing musical notes mapped to touched keys on the onscreen musical keyboard with those of another musical instrument. Mixing may indicate a procedure that generates interval data by mixing musical notes input through the onscreen musical keyboard and those of another musical instrument corresponding to the input musical notes.

Note that the mobile terminal according to the teachings of the present invention is a terminal that can be used for song writing utilizing an onscreen musical keyboard on the touch screen, and may be any terminal, such as a mobile phone, personal digital assistant (PDA), code division multiple access (CDMA) terminal, wideband CDMA (WCDMA) terminal, global system for mobile communications (GSM) terminal, international mobile telecommunications 2000 (IMT 2000) terminal, smart phone, or universal mobile telecommunications system (UMTS) terminal.

Figure 1:
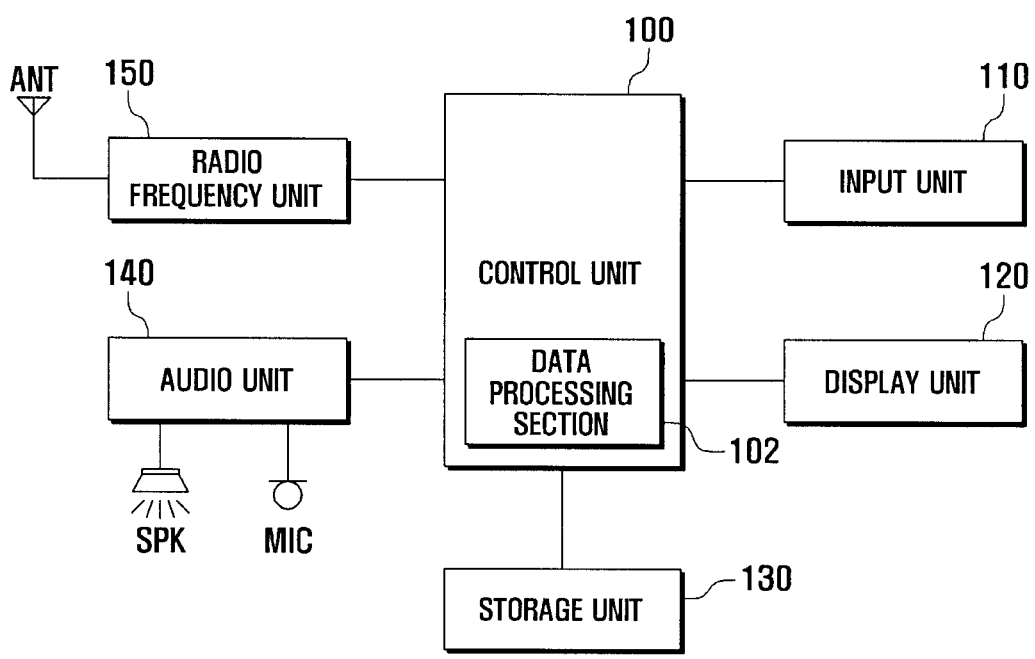
FIG. 1 is a block diagram illustrating a mobile terminal according to an embodiment of the present invention.

FIG. 1 is a block diagram illustrating a mobile terminal according to an exemplary embodiment of the present invention.

Referring to FIG. 1, the mobile terminal includes a control unit 100, input unit 110, display unit 120, storage unit 130, audio unit 140, and radio frequency unit 150. In particular, the control unit 100 includes a data processing section 102.

The input unit 110 includes a plurality of keys for inputting alphanumeric information, and a plurality of function keys for setting various functions. The function keys may include an effect sound key, direction key, side key, shortcut key, scroll wheel, and setting key. Examples of a setting key may include a save key, pre-listening key, upload key, and download key. The input unit 110 may be implemented using a touch screen, in which case the input unit 110 may also provide a display function. The input unit 110 sends an input key signal related to user settings and controlling of the mobile terminal to the control unit 100.

When an onscreen musical keyboard of an octave is displayed on the display unit 120, the input unit 110 sends a key signal corresponding to a touched key of the onscreen musical keyboard and an octave level change signal corresponding to a touch on a flick zone of the onscreen musical keyboard to the control unit 100. The flick zone is a zone that detects a touch and movement in the left or right direction to shift the onscreen musical keyboard. For mixing a song written through the onscreen musical keyboard and contents generated through other musical instruments together, the input unit 110 sends a signal input by an effect sound button to the control unit 100. The input unit 110 sends an input signal, which initiates generation of interval data by replacing musical notes mapped to touched keys on the onscreen musical keyboard with those of another musical instrument, to the control unit 100.

The input unit 110 sends function key signals, for pre-listening, saving and uploading of a composed song, to the control unit 100.

The display unit 120 displays operation states, operation results, and various information under the control of the control unit 100. The display unit 120 displays menus of the mobile terminal, information input by the user, function setting information, and information to be provided to the user. The display unit 120 may include a panel that is composed of display devices such as liquid crystal display (LCD) devices or organic light emitting diodes (OLED). In particular, the display unit 120 has a touch screen capability, and can act as an input means performing the function of the input unit 110. The display unit 120 receives a user command or graphic information by generating a voltage or current signal corresponding to a pressed location on a touch panel of the touch screen. The touch screen includes a touch panel, LCD panel, and backlight stacked in series. The touch screen may further include signal lines transmitting signals from the touch panel to the control unit 100, and a tape carrier package (TCP) connected to the lower substrate of the LCD panel to feed electric signals to the driving part of the LCD panel. In particular, the display unit 120 highlights a touched key of the onscreen musical keyboard under the control of the control unit 100. The display unit 120 displays a flick zone for changing the octave level. The display unit 120 displays the octave level, which may be lowered or raised according to the direction of a touch on the flick zone. The display unit 120 displays a list of contents that are generated through various musical instruments and are mixable with the song written through the onscreen musical keyboard, under the control of the control unit 100.

The storage unit 130 stores application programs for embodiments of the present invention. The storage unit 130 may include a program storage area and a data storage area. The program storage area stores an operating system for enabling the mobile terminal to control the operation of various hardware within the mobile terminal and software (programs) operating within the mobile terminal, a program for obtaining interval data on the basis of notes corresponding to keys touched on the onscreen musical keyboard and the current octave, and a program for converting interval data of a composed song into sound data recognizable by the mobile terminal. The data storage area stores data generated during the use of the mobile terminal, interval data obtained on the basis of notes corresponding to keys touched on the onscreen musical keyboard and the current octave, and sound data recognizable by the mobile terminal obtained through conversion from interval data of a composed song.

The audio unit 140 reproduces an audio signal from the control unit 100, and sends an audio signal such as a voice signal from a microphone MIC to the control unit 100. That is, the audio unit 140 converts voice and acoustic data into audible sounds for output through a speaker SPK, and converts an audio signal, such as a voice signal from a microphone MIC, into audio data for output to the control unit 100.

In particular, the audio unit 140 reproduces sound data that is obtained through conversion from interval data created on the basis of notes corresponding to keys touched on the onscreen musical keyboard and the associated octave. The audio unit 140 plays a song that is created through mixing a song material composed through the onscreen musical keyboard and contents generated through various musical instruments together, under the control of the control unit 100.

The radio frequency unit 150 establishes a communication channel between the mobile terminal and a serving base station, and performs communication operations to send and receive necessary signals. The radio frequency unit 150 may include a radio frequency transmitter for up-converting the frequency of a signal to be transmitted and amplifying the signal, and a radio frequency receiver for low-noise amplifying a received signal and down-converting the frequency of the signal. In particular, the radio frequency unit 150 performs communication operations between the mobile terminal and base station through a wireless connection, e.g, Internet, to upload song data composed through the onscreen musical keyboard, and to download contents generated through other musical instruments.

The data processing section 102 controls input through the onscreen musical keyboard under the control of the control unit 100. In particular, the data processing section 102 obtains a musical note corresponding to a touched key on the onscreen musical keyboard. The data processing section 102 may compute the coordinates of a touched location on the touch screen, identify the musical note mapped to the computed coordinates, create interval data on the basis of the identified musical note and associated octave, convert the interval data into sound data recognizable by the mobile terminal, and store the sound data in the storage unit 130.

The data processing section 102 may create interval data by mixing a song written through the onscreen musical keyboard and the contents generated through other musical instruments together. The data processing section 102 may mix a song written through the onscreen musical keyboard with the contents generated through other musical instruments to create a new song. The data processing section 102 may create interval data by replacing a note corresponding to a touched key on the onscreen musical keyboard with a note of a given musical instrument. The data processing section 102 may create interval data by mixing a note corresponding to a touched key on the onscreen musical keyboard with a note processed by a given musical instrument.

The data processing section 102 converts a piece of interval data obtained through mixing into sound data usable by the mobile terminal.

The control unit 100 controls the overall operation of the mobile terminal and signal exchange between internal blocks thereof. In particular, upon reception of an input signal for song writing mode activation, the control unit 100 controls the display unit 120 to display an onscreen musical keyboard of an octave. Here, the control unit 100 can control the display unit 120 to represent a default octave composed of eight notes from the middle 'Do' being the reference note to the next 'Do'. Upon detection of an octave level change signal through the flick zone, the control unit 100 can control the display unit 120 to change the octave level of the onscreen musical keyboard to a higher octave or a lower octave. For example, if an octave level change signal indicates the left-hand direction, the control unit 100 controls the display unit 120 to shift the onscreen musical keyboard to the left-hand direction so that the onscreen musical keyboard represents a new octave of eight notes.

In response to a touch on a key of the onscreen musical keyboard on the display unit 120, the control unit 100 controls the data processing section 102 to identify the note mapped to the touched key after computing the coordinates of the touched key, and to create interval data on the basis of the identified note and the set octave. The control unit 100 may set a default octave to include eight notes from the middle 'Do' being the reference note to the next 'Do'. The control unit 100 controls the data processing section 102 to store the created interval data in the storage unit 130, and to convert the interval data into sound data usable by the mobile terminal. The created sound data may be a file in an MP3, WMA, RA, AIFF or MIDI format recognizable by the mobile terminal. Sound data in a file format may be converted into sound data in another file format according to applications. The control unit 100 can control the audio unit 140 to reproduce the created sound data.

Upon reception of the sound signal, the control unit 100 controls the display unit 120 to display a list of contents that are generated through other musical instruments and are playable together with the written song. That is, the control unit 100 displays a list of contents mixable with the written song. The control unit 100 controls the data processing section 102 to mix the written song with a selected content and to generate sound data usable by the mobile terminal from the mixed result. The control unit 100 may control the data processing section 102 to generate interval data by applying a musical note mapped to a touched key of the onscreen musical keyboard to a selected one of musical instruments playable together.

As described above, the song writing apparatus using the touch screen in a mobile terminal may receive an input musical note through the onscreen musical keyboard, create interval data using the input note and associated octave, convert at least one piece of interval data into sound data for output, change the octave level, and mix a composed song with contents generated through various musical instruments. Next, operations of the song writing apparatus are described in detail with reference to the drawings.

Figure 2:
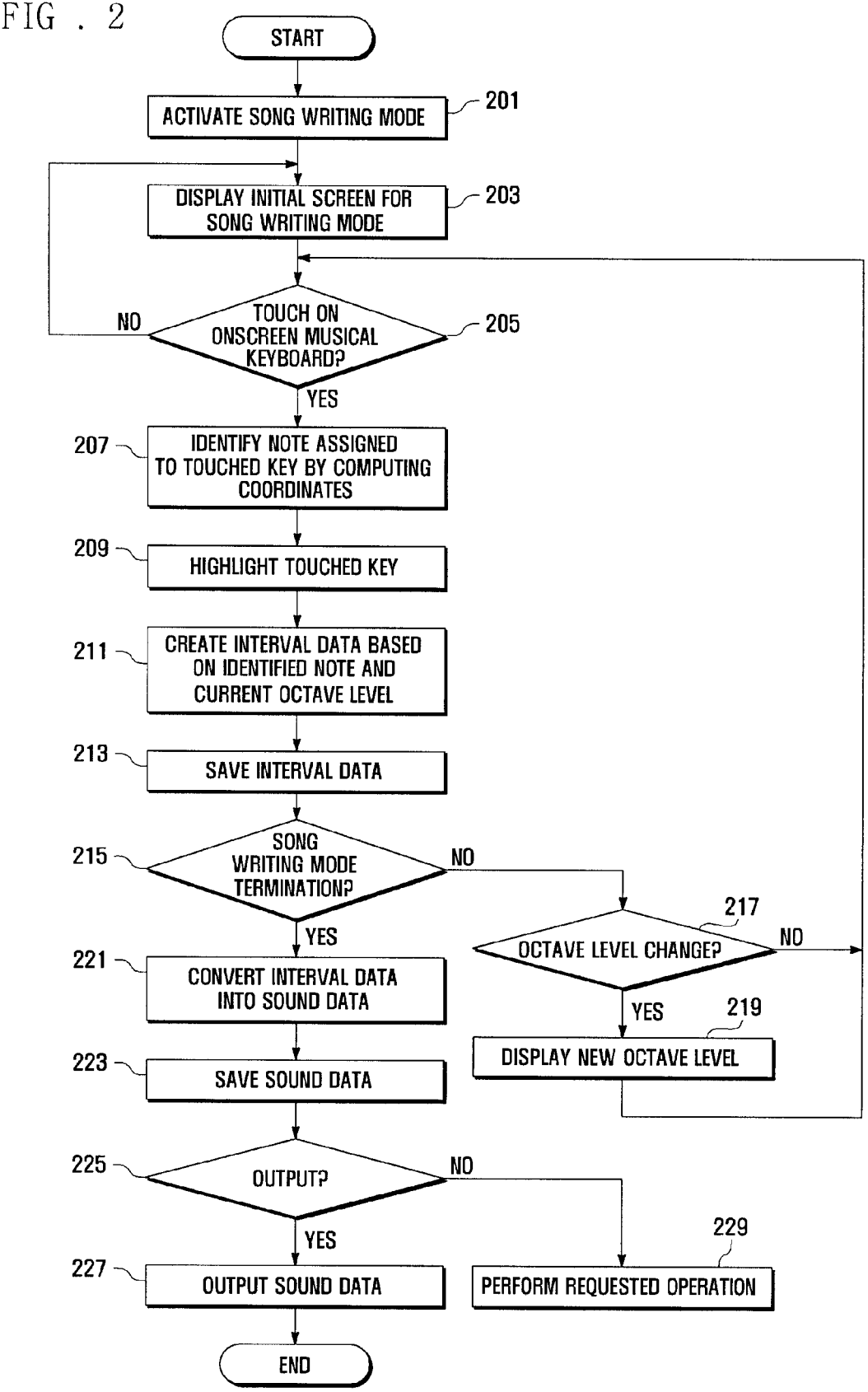
FIG. 2 is a flow chart of a song writing procedure using an onscreen musical keyboard on the touch screen of a mobile terminal according to another embodiment of the present invention.

FIG. 2 is a flow chart of a song writing procedure using an onscreen musical keyboard on the touch screen of a mobile terminal according to another exemplary embodiment of the present invention. FIGS. 3A to 3E are screen representations illustrating steps in the procedure of FIG. 2.

Figure 3A:
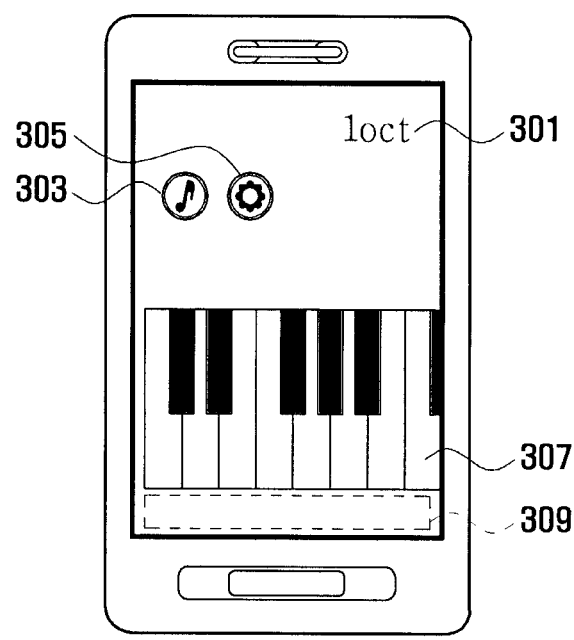
FIGS. 3A to 3E are screen representations illustrating steps in the procedure of FIG. 2.

Referring to FIG. 2, the control unit 100 of the mobile terminal receives an input signal for song writing mode activation (201). The control unit 100 controls the display unit 120 to display an initial screen for the song writing mode (203). Here, an onscreen musical keyboard of an octave is included in the initial screen, and the current octave level and the flick zone are also included. For example, as shown in FIG. 3A, upon activation of the song writing mode, the control unit 100 controls the display unit 120 to display an onscreen musical keyboard 307 of an octave, octave level indication 301, effect sound button 303, setting button 305, and flick zone 309. The octave level indicator 301 indicates the current octave level governing the eight notes of the onscreen musical keyboard 307 on the display unit 120.

The control unit 100 checks whether a touch is detected on the onscreen musical keyboard (205). When a touch is not detected at step 205, the control unit 100 controls the display unit 120 to continuously display the initial screen for the song writing mode.

Figure 3B:
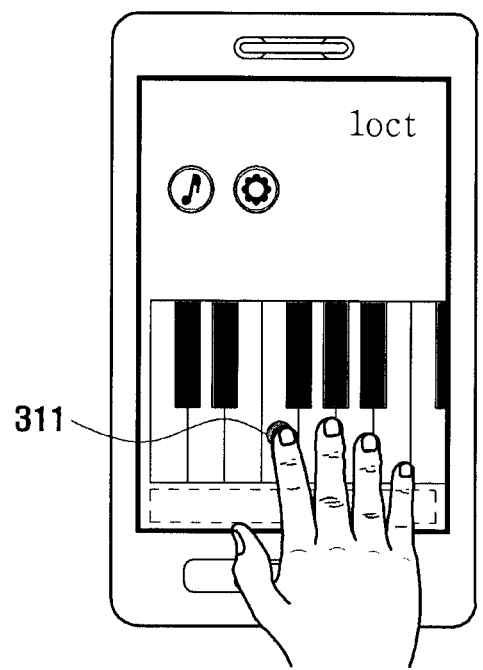

When a touch is detected on the onscreen musical keyboard, the data processing section 102 computes the coordinates of the touched location on the display unit 120, and identifies the note assigned to the computed coordinates (207). For example, as shown in FIG. 3B, the data processing section 102 computes the coordinates 311 of a touched location on the touch screen, and identifies the note assigned to the key at the computed coordinates 311.

In the case where two or more touches are performed, the control unit 100 can compute the coordinates of all the touched locations and identify all corresponding notes.

Figure 3C:
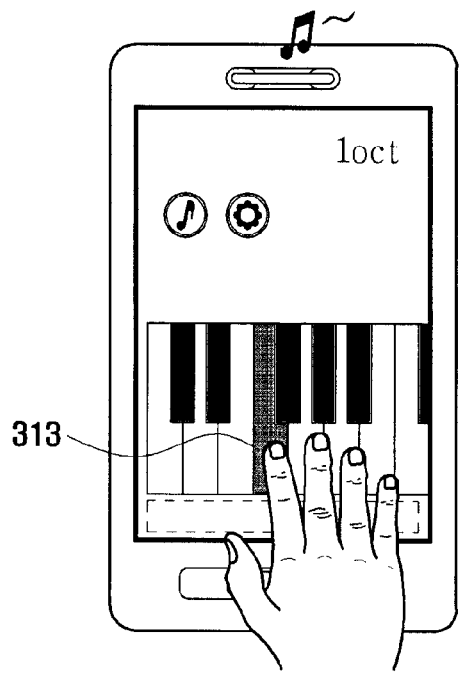

The control unit 100 controls the display unit 120 to highlight the touched key whose note is identified at step 209 by the data processing section 102 (209). For example, as shown in FIG. 3C, the control unit 100 controls the display unit 120 to highlight a key 313 at the touched location.

The control unit 100 controls the data processing section 102 to create interval data using the note corresponding to the touched key and the current octave level (211). Here, the control unit 100 may set a default octave composed of eight notes from the middle 'Do' to the next 'Do'. The control unit 100 may also set a default octave composed of eight notes from a note other than the middle 'Do' to the same note in a higher or lower octave.

The control unit 100 controls the data processing section 102 to store the created interval data in the storage unit 130 (213).

The control unit 100 checks whether a signal for song writing mode termination is input (215). Here, the control unit 100 may detect a signal for song writing mode termination generated by a setting button.

When a signal for song writing mode termination is input, the control unit 100 controls the data processing section 102 to convert the interval data into sound data recognizable by the mobile terminal (221). The sound data may be files in different formats usable by other applications. The control unit 100 stores the sound data in the storage unit 130 (223).

Figure 3D:
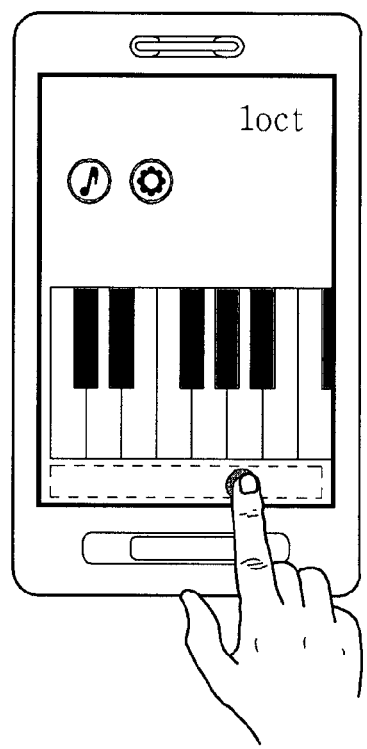
Figure 3E:
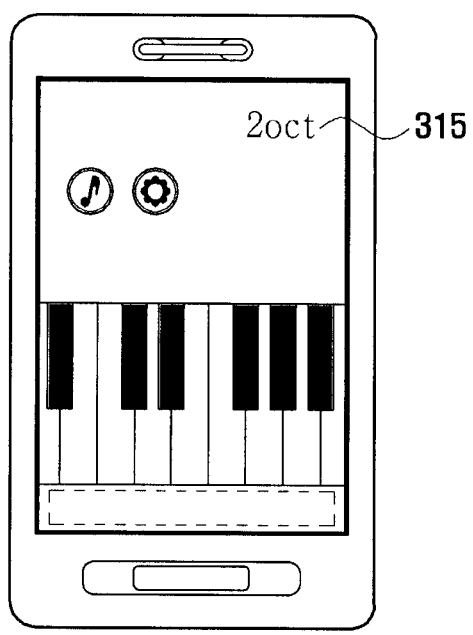

When a signal for song writing mode termination is not input at step 215, the control unit 100 checks whether a signal for octave level change is input (217). When a signal for octave level change is input through the flick zone, the control unit 100 lowers or raises the current octave level and controls the display unit 120 to represent the new octave level (219). For example, the control unit 100 may control the octave level change according to a touch on the flick zone as shown in FIG. 3D, and control the display unit 120 to update the octave level indication 315 as shown in FIG. 3E. After the octave level change, the control unit 100 returns to step 205 for further detection of a touch on the onscreen musical keyboard.

When a signal for octave level change is not input at step 217, the control unit 100 returns to step 205 for further detection of a touch on the onscreen musical keyboard.

After saving the sound data, the control unit 100 checks whether a signal for sound data output is input (225). The control unit 100 may detect a signal for sound data output from the pre-listening key of the input unit 110.

When a signal for sound data output is input, the control unit 100 controls the audio unit 140 to output the sound data through the speaker SPK (227).

When a signal for sound data output is not input, the control unit 100 performs a requested operation (229).

Figure 4:
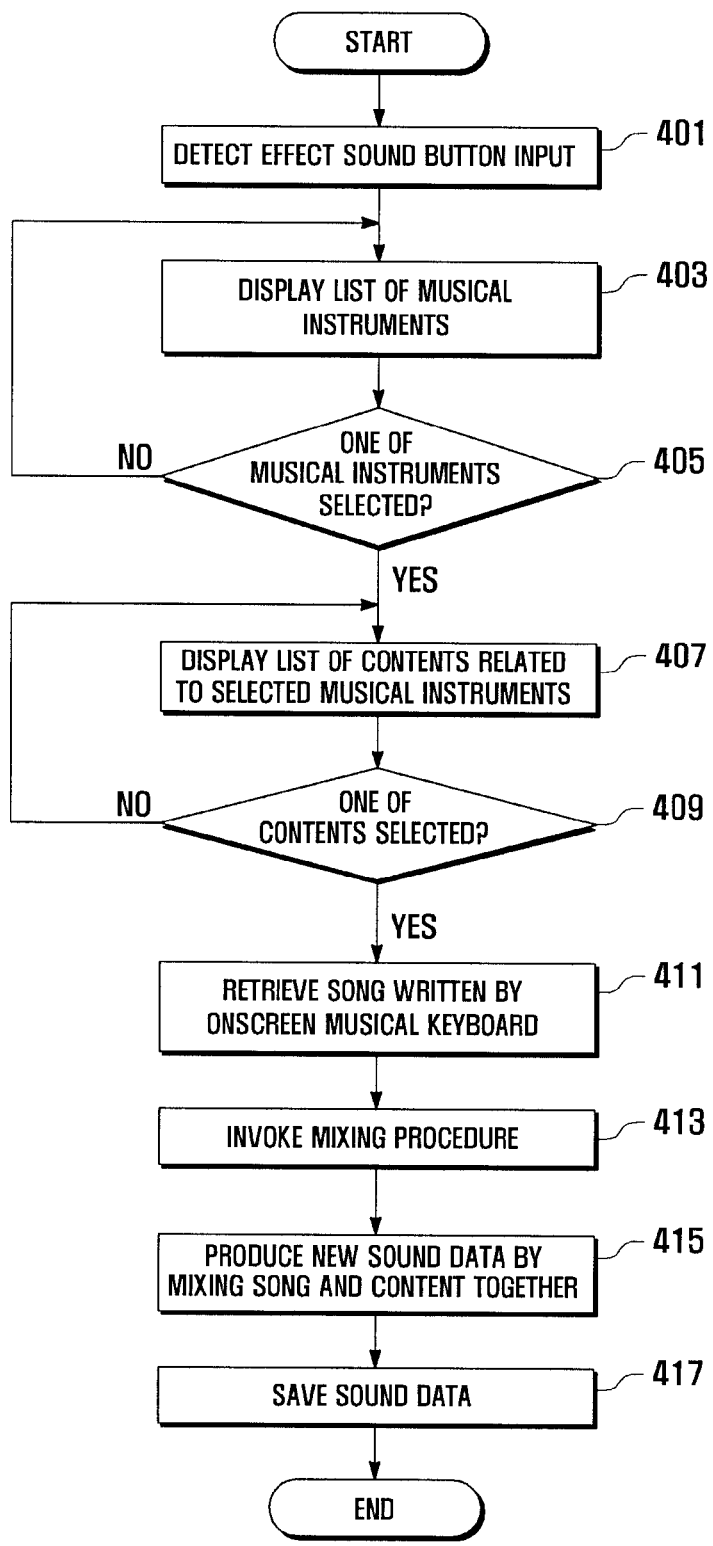
FIG. 4 is a flow chart of a procedure to mix a composed song with contents generated through another musical instrument according to another embodiment of the present invention.
Figure 5A:
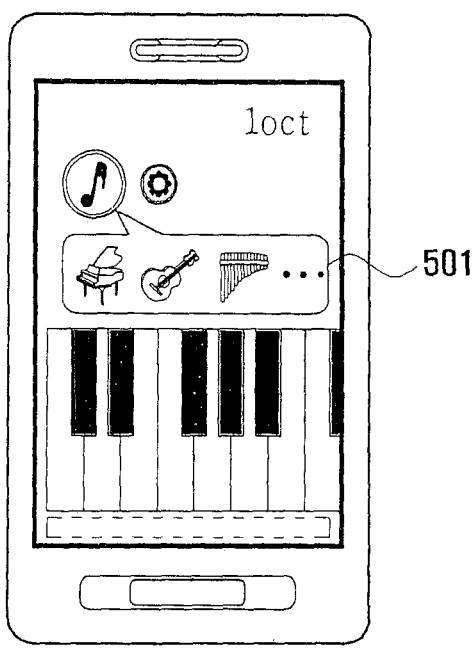
FIGS. 5A and 5B are screen representations illustrating steps in the mixing procedure of FIG. 4.
Figure 5B:
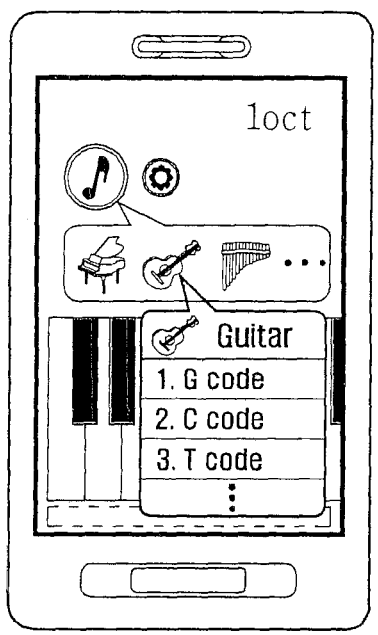

FIG. 4 is a flow chart of a procedure to mix a composed song with contents generated through another musical instrument. FIGS. 5A and 5B are screen representations illustrating steps in the mixing procedure of FIG. 4.

Referring to FIG. 4, the control unit 100 of the mobile terminal detects an effect sound button signal for mixing a song composed through the song writing method with a content generated through another musical instrument (401).

Upon detection of an effect sound button signal, the control unit 100 controls the display unit 120 to display a list of musical instruments mixable with a song written through the onscreen musical keyboard (403). For example, as shown in FIG. 5A, the control unit 100 may cause a list of various musical instruments to be displayed on the touch screen.

The control unit 100 checks whether a signal for selecting one of the listed musical instruments is detected (405). That is, the user may select a musical instrument for mixing. Step 404 may be repeated to select multiple musical instruments for mixing.

When a signal for selecting one of the listed musical instruments is not detected, the control unit 100 controls the display unit 120 to continuously display the list of musical instruments. When a signal for selecting one of the listed musical instruments is detected, the control unit 100 controls the display unit 120 to display a list of contents related to the selected musical instrument (407). For example, when a guitar is selected as shown in FIG. 5B, the control unit 100 can control the display unit 120 to display "G code", "C code" and "F code" in a popup window as a content list for the guitar.

The control unit 100 checks whether a signal for selecting one of the listed contents is detected (409). When a signal for selecting one of the listed contents is not detected, the control unit 100 causes continued display of the list of contents.

When a signal for selecting one of the listed contents is detected, the control unit 100 retrieves a song written by the onscreen musical keyboard from the storage unit 130 (411).

The control unit 100 invokes a mixing procedure that mixes the retrieved song with the content related to the selected musical instrument (413), and controls the data processing section 102 to produce new sound data utilizing the mixing procedure (415).

The control unit 100 stores the newly produced sound data in the storage unit 130 (417). Later, upon request, the control unit 100 may reproduce the stored sound data through the audio unit 140.

Figure 6:
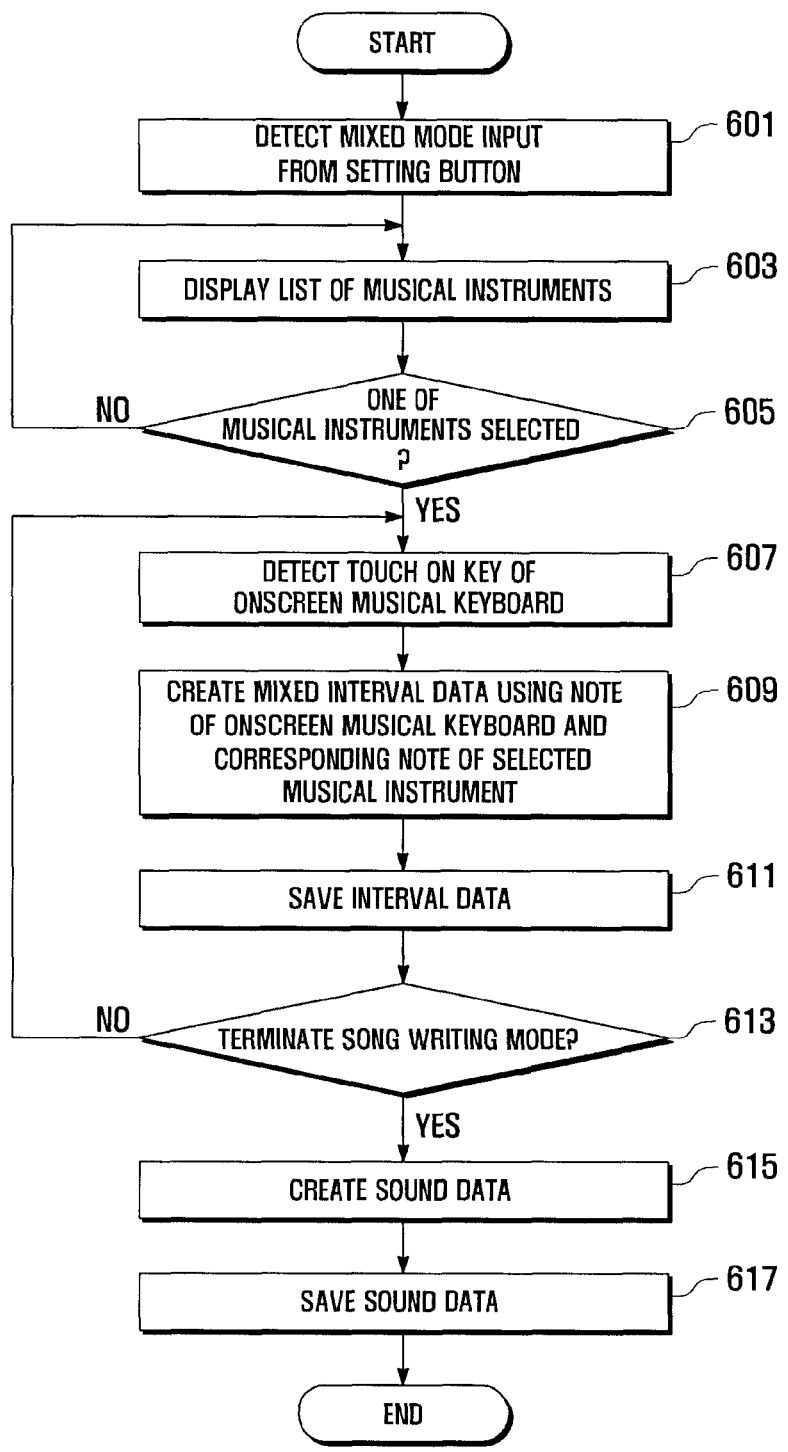
FIG. 6 is a flow chart of a song writing procedure using an onscreen musical keyboard and other musical instrument according to another embodiment of the present invention.

FIG. 6 is a flow chart of a song writing procedure using a combination of an onscreen musical keyboard and another musical instrument.

Referring to FIG. 6, the control unit 100 of the mobile terminal detects a mixed mode signal for composing a song utilizing a combination of the onscreen musical keyboard and other musical instrument (601).

Upon detection of a mixed mode signal, the control unit 100 controls the display unit 120 to display a list of musical instruments mixable with the onscreen musical keyboard (603). The control unit 100 checks whether a signal for selecting one of the listed musical instruments is detected (605). Step 605 may be repeated to select multiple musical instruments used together for mixing.

When a signal for selecting one of the listed musical instruments is not detected, the control unit 100 controls the display unit 120 to continuously display the list of musical instruments.

When a signal for selecting one of the listed musical instruments is detected, the control unit 100 detects a touch on a key of the onscreen musical keyboard (607). Upon detection of a touch, the control unit 100 controls the data processing section 102 to identify the note mapped to the touched key, to extract a note of the selected musical instrument corresponding to the identified note, and to create mixed interval data on the basis of the note associated with the onscreen musical keyboard and the corresponding note of the selected musical instrument (609).

After creation of the mixed interval data, the control unit 100 controls the data processing section 102 to store the created interval data in the storage unit 130 (611).

The control unit 100 checks whether a signal for song writing mode termination is input (613). Here, the control unit 100 may detect a signal for song writing mode termination generated by a setting button.

When a signal for song writing mode termination is input, the control unit 100 controls the data processing section 102 to convert the interval data into sound data recognizable by the mobile terminal (615), and stores the resulting sound data in the storage unit 130 (617).

When a signal for song writing mode termination is not input, the control unit 100 returns to step 607 to further detect a touch on a key of the onscreen musical keyboard.

Figure 7:
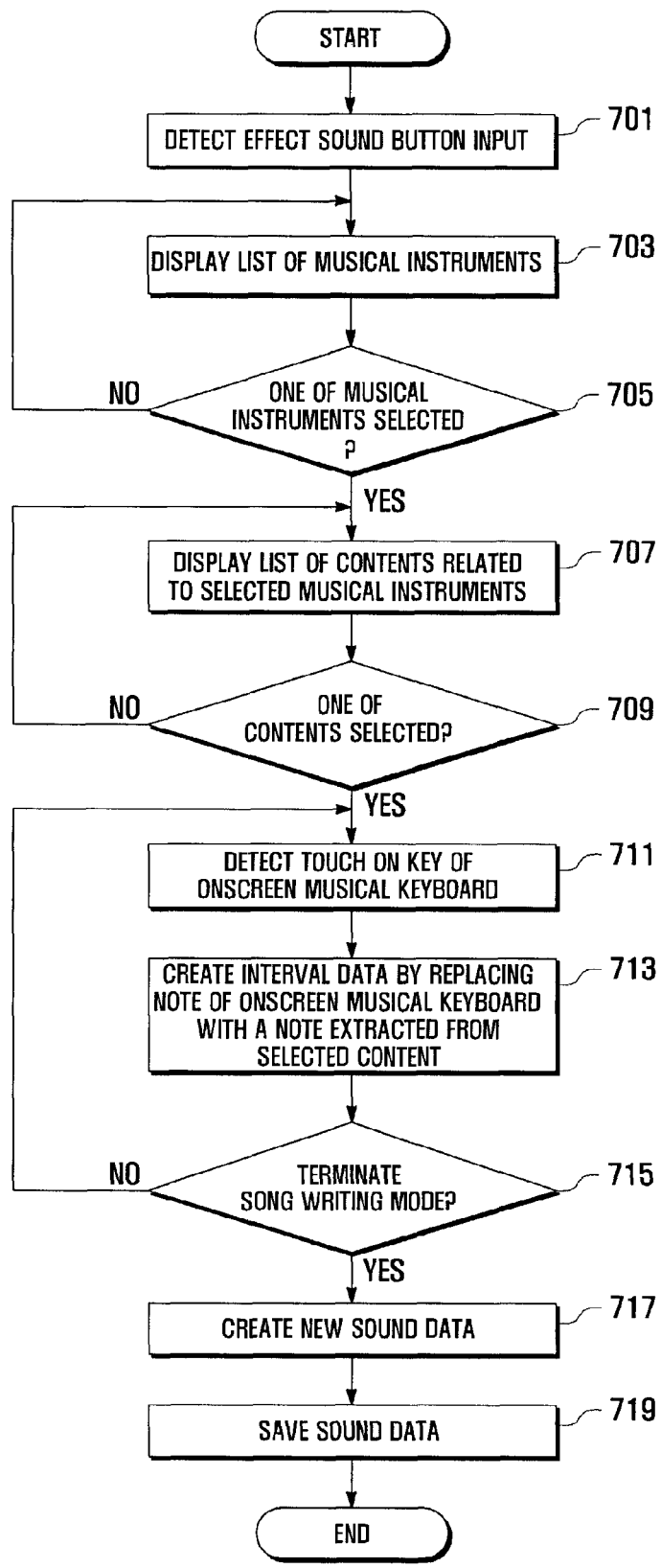
FIG. 7 is a flow chart illustrating a procedure of song writing by replacing musical notes mapped to touched keys on the onscreen musical keyboard with those of another musical instrument.

FIG. 7 is a flow chart illustrating a procedure of song writing by replacing musical notes mapped to touched keys on the onscreen musical keyboard with those of another musical instrument.

Referring to FIG. 7, the control unit 100 of the mobile terminal detects an effect sound button signal for writing a song by replacing a musical note given by the onscreen musical keyboard with that of another musical instrument (701).

Upon detection of an effect sound button signal, the control unit 100 controls the display unit 120 to display a list of musical instruments that may produce a note replacing a note given by the onscreen musical keyboard (703).

The control unit 100 checks whether a signal for selecting one of the listed musical instruments is detected (705). Step 705 may be repeated to select multiple musical instruments used together for mixing.

When a signal for selecting one of the listed musical instruments is not detected, the control unit 100 controls the display unit 120 to continuously display the list of musical instruments.

When a signal for selecting one of the listed musical instruments is detected, the control unit 100 controls the display unit 120 to display a list of contents related to the selected musical instrument (707).

The control unit 100 checks whether a signal for selecting one of the listed contents is detected (709). When a signal for selecting one of the listed contents is not detected, the control unit 100 causes continued display of the list of contents.

When a signal for selecting one of the listed contents is detected, the control unit 100 identifies a note mapped to a touched key on the onscreen musical keyboard (711).

The control unit 100 creates interval data by replacing the identified note of the onscreen musical keyboard with a note extracted from the selected content (713). Thereafter, the control unit 100 checks whether a signal for song writing mode termination is input (715). Here, the control unit 100 may detect a signal for song writing mode termination generated by a setting button.

When a signal for song writing mode termination is input, the control unit 100 controls the data processing section 102 to convert the interval data into sound data recognizable by the mobile terminal (717), and stores the resulting sound data in the storage unit 130 (719).

When a signal for song writing mode termination is not input, the control unit 100 returns to step 711 to further detect a touch on a key of the onscreen musical keyboard. As would be appreciated, a song writing mode termination may be explicitly determined or implicitly determined. For example, the section of a second application may be used to provide a song writing mode termination signal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A song writing method using a touch screen in a mobile terminal, comprising:
   displaying, upon activation of a song writing mode, an onscreen musical keyboard of an octave on the touch screen;
   identifying, when a key of the onscreen musical keyboard is touched, a musical note mapped to the touched key through computation of coordinates of the touched key;
   creating musical interval data on the basis of the identified note and the current octave level; and
   converting the musical interval data into sound data recognizable by the mobile terminal; and
   outputting the sound data; and
   changing, upon detection of a touch on a flick zone, the current octave level by lowering or raising the current octave level according to the direction of a flick.

2. The song writing method of claim 1, wherein displaying the onscreen musical keyboard comprises displaying an indication of the current octave level at a location of the touch screen.

3. The song writing method of claim 1, further comprising saving the created interval data and resulting sound data.

4. The song writing method of claim 1, further comprising:
   displaying, upon detection of an effect sound button signal, a list of contents related to a given musical instrument mixable with the onscreen musical keyboard;
   mixing, upon selection of one of the listed contents, a song written using the onscreen musical keyboard with a song in the selected content; and
   converting the result of mixing the songs together into sound data.

5. The song writing method of claim 1, wherein, in creating the musical interval data, the interval data is created by one of replacing a note mapped to a touched key of the onscreen musical keyboard with a note of a given musical instrument, and mixing a note mapped to a touched key of the onscreen musical keyboard with a note of a given musical instrument corresponding to the note mapped to the touched key.

6. The song writing method of claim 1, further comprising reproducing the sound data.

7. A song writing apparatus using a touch screen in a mobile terminal, comprising:
   a display unit displaying, upon activation of a song writing mode, an onscreen musical keyboard of an octave on the touch screen;
   a data processing section identifying, when a key of the onscreen musical keyboard is touched, a musical note mapped to the touched key through computation of coordinates of the touched key, creating musical interval data on the basis of the identified note and the current octave level, and converting the musical interval data into sound data recognizable by the mobile terminal and outputting the sound data; and a control unit outputting the sound data;

wherein the control unit lowers or raises, upon detection of a touch on a flick zone, the current octave level according to the direction of a flick.

8. The song writing apparatus of claim 7, wherein the display unit displays an indication of the current octave level at a location of the touch screen.

9. The song writing apparatus of claim 7, further comprising a storage unit storing the created interval data and resulting sound data.

10. The song writing apparatus of claim 7, wherein the display unit displays, upon detection of an effect sound button signal, a list of contents related to a given musical instrument mixable with the onscreen musical keyboard.

11. The song writing apparatus of claim 10, wherein the data processing section mixes, upon selection of one of the listed contents, a song written using the onscreen musical keyboard with a song in the selected content to produce sound data.

12. The song writing apparatus of claim 7, wherein the data processing section creates the interval data by one of replacing a note mapped to a touched key of the onscreen musical keyboard with a note of a given musical instrument, and mixing a note mapped to a touched key of the onscreen musical keyboard with a note of a given musical instrument corresponding to the note mapped to the touched key.

13. The song writing apparatus of claim 7, further comprising an audio unit reproducing the sound data.

14. A mobile terminal comprising:

an input device, including at least one key element;

a processor in communication with a memory, the memory include code which when accessed by the processor causes the processor to execute the steps of:

identifying, when a key of the input device is touched, said key representing a musical note mapped to the touched key through computation of coordinates of the touched key;

creating musical interval data on the basis of the identified note and the current octave level; and converting the musical interval data into sound data recognizable by the mobile terminal; and a display device comprising a touch screen, said display device displaying at least one of a default octave level of musical notes and a flick zone that the processor changes an octave level from the default octave level to a current octave level corresponding to a direction of a detected flick in the flick zone of the touch screen.

15. The terminal of claim 14, further comprising:

an output device for outputting the sound data.

16. The terminal of claim 14 wherein said input device is a touch screen.

17. The terminal of claim 16 wherein said keys are displayed on said touch screen.

* * * * *